(12) United States Patent
Abe et al.

(10) Patent No.: US 8,841,023 B2
(45) Date of Patent: Sep. 23, 2014

(54) MULTI-COMPONENT-SYSTEM LITHIUM PHOSPHATE COMPOUND PARTICLE HAVING AN OLIVINE STRUCTURE AND LITHIUM SECONDARY BATTERY EMPLOYING THE LITHIUM PHOSPHATE COMPOUND PARTICLE AS A POSITIVE ELECTRODE MATERIAL

(75) Inventors: Hidetoshi Abe, Iwaki (JP); Tomonori Suzuki, Iwaki (JP); Takashi Eguro, Iwaki (JP); Kiyoshi Kanamura, Hachioji (JP); Mitsumasa Saito, Tokyo (JP)

(73) Assignees: The Furukawa Battery Co., Ltd., Kanagawa (JP); Tokyo Metropolitan University, Tokyo (JP); Sumitomo Osaka Cement Co., Ltd., Tokyo (JP)

( * ) Notice: Subject to any disclaimer, the term of this patent is extended or adjusted under 35 U.S.C. 154(b) by 650 days.

(21) Appl. No.: 13/090,303

(22) Filed: Apr. 20, 2011

(65) Prior Publication Data
US 2011/0195304 A1 Aug. 11, 2011

Related U.S. Application Data

(63) Continuation of application No. PCT/JP2009/068074, filed on Oct. 20, 2009.

(30) Foreign Application Priority Data

Oct. 20, 2008 (JP) ................................. 2008-270091

(51) Int. Cl.
$H01M\ 10/02$ (2006.01)
$H01M\ 4/90$ (2006.01)
$H01M\ 4/96$ (2006.01)
$H01M\ 4/88$ (2006.01)
$H01M\ 4/04$ (2006.01)
$C01B\ 25/45$ (2006.01)
$H01M\ 4/62$ (2006.01)
$H01M\ 4/36$ (2006.01)
$H01M\ 4/58$ (2010.01)
$H01M\ 10/052$ (2010.01)
$H01M\ 4/02$ (2006.01)

(52) U.S. Cl.
CPC ....... $H01M\ 4/5825$ (2013.01); $H01M\ 2004/028$ (2013.01); $H01M\ 2004/021$ (2013.01); $Y02E\ 60/122$ (2013.01); $H01M\ 4/0471$ (2013.01); $C01B\ 25/45$ (2013.01); $H01M\ 4/625$ (2013.01); $H01M\ 4/362$ (2013.01); $H01M\ 10/052$ (2013.01)
USPC ........................................ 429/188; 252/182.1

(58) Field of Classification Search
CPC ......... H01M 10/02; H01M 4/90; H01M 4/96; H01M 4/88
See application file for complete search history.

(56) References Cited

U.S. PATENT DOCUMENTS

| | | | |
|---|---|---|---|
| 6,528,033 B1 | 3/2003 | Barker et al. | |
| 6,702,961 B2 | 3/2004 | Barker et al. | |
| 6,716,372 B2 | 4/2004 | Barker et al. | |
| 6,730,281 B2 | 5/2004 | Barker et al. | |
| 7,276,218 B2 | 10/2007 | Barker et al. | |
| 7,550,098 B2 | 6/2009 | Barker et al. | |
| 7,964,118 B2 * | 6/2011 | Iizuka et al. | 252/520.21 |
| 8,119,285 B2 | 2/2012 | Hatta et al. | |
| 8,163,430 B2 | 4/2012 | Barker et al. | |
| 8,168,150 B2 | 5/2012 | Hemmer et al. | |
| 2001/0055718 A1 | 12/2001 | Li et al. | |
| 2003/0143465 A1 | 7/2003 | Takahashi et al. | |
| 2004/0029011 A1 | 2/2004 | Ravet et al. | |
| 2007/0001153 A1 | 1/2007 | Barker et al. | |
| 2008/0020277 A1 | 1/2008 | Barker et al. | |

FOREIGN PATENT DOCUMENTS

| | | |
|---|---|---|
| CN | 1424980 A | 6/2003 |
| CN | 1514804 A | 7/2004 |
| CN | 1632969 A | 6/2005 |
| CN | 1635648 A | 7/2005 |
| CN | 1871726 A | 11/2006 |
| CN | 1883067 A | 12/2006 |
| CN | 101065322 A | 10/2007 |

| | | | |
|---|---|---|---|
| EP | 1 150 367 A2 | 10/2001 |
| EP | 1 195 835 A2 | 4/2002 |
| EP | 1 936 721 A1 | 6/2008 |
| JP | 9-134724 A | 5/1997 |
| JP | 9-134725 A | 5/1997 |
| JP | 2001-85010 A | 3/2001 |
| JP | 2001-110414 A | 4/2001 |
| JP | 2003-157845 A | 5/2003 |
| JP | 2003-292309 A | 10/2003 |
| JP | 2004-63270 A | 2/2004 |
| JP | 2005-50684 A | 2/2005 |
| JP | 2005-116392 A | 4/2005 |
| JP | 2007-103298 A | 4/2007 |
| WO | WO 2007/034821 A1 | 3/2007 |

OTHER PUBLICATIONS

D. Wang et al; Continuous Solid Solutions $LiFe_{1-X}CO_XPO_4$ and Its Electrochemical Performanace; Journal of Power Sources 146; 2005; pp. 580-583.

International Search Report dated Feb. 2, 2010 (in English) in counterpart International Application No. PCT/JP2009/068074.

International Preliminary Report on Patentability (IPRP) dated May 26, 2011 (in English) in parent International Application No. PCT/JP2009/068074.

Extended European Search Report (EESR) dated Jan. 2, 2013 (in English) issued in counterpart European Application No. 09822031.2.

Chinese Office Action dated Nov. 21, 2012 (and English translation thereof) in counterpart Chinese Application No. 200980141512.7.

* cited by examiner

*Primary Examiner* — Karie O'Neill Apicella

(74) *Attorney, Agent, or Firm* — Holtz, Holtz, Goodman & Chick PC

(57) ABSTRACT

There is disclosed a multi-component system lithium phosphate compound particles having an olivine structure and represented by a general formula of $Li_YM1_{1-Z}M2_ZPO_4$ in which M1 is one metal element selected from the group consisting of Fe, Mn and Co, Y is a number satisfying a formula of $0.9 \leq Y \leq 1.2$, M2 is at least one metal element selected from the group consisting of Mn, Co, Mg, Ti and Al, and Z is an number satisfying a formula of $0 < Z \leq 0.1$, wherein a concentration of the metal element M2 existing on a surface of the particle is higher than the concentration of that existing in core portion of the particle and that the concentration of the metal element M2 is continuously lowered from the surface of particle to a core portion of the particle.

5 Claims, 2 Drawing Sheets

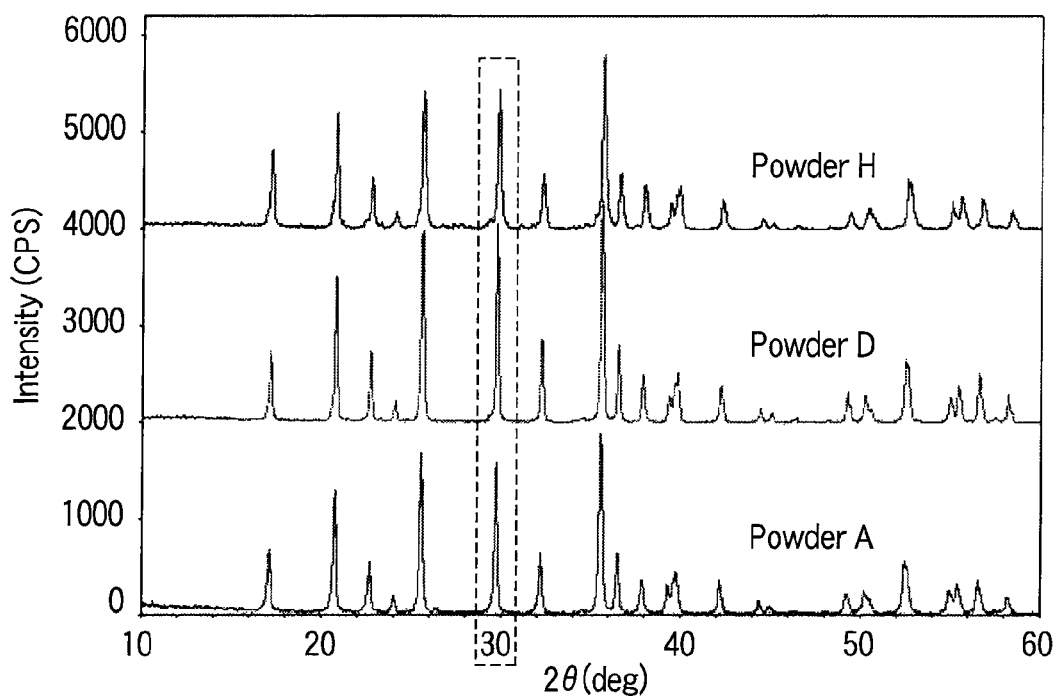
F I G. 3
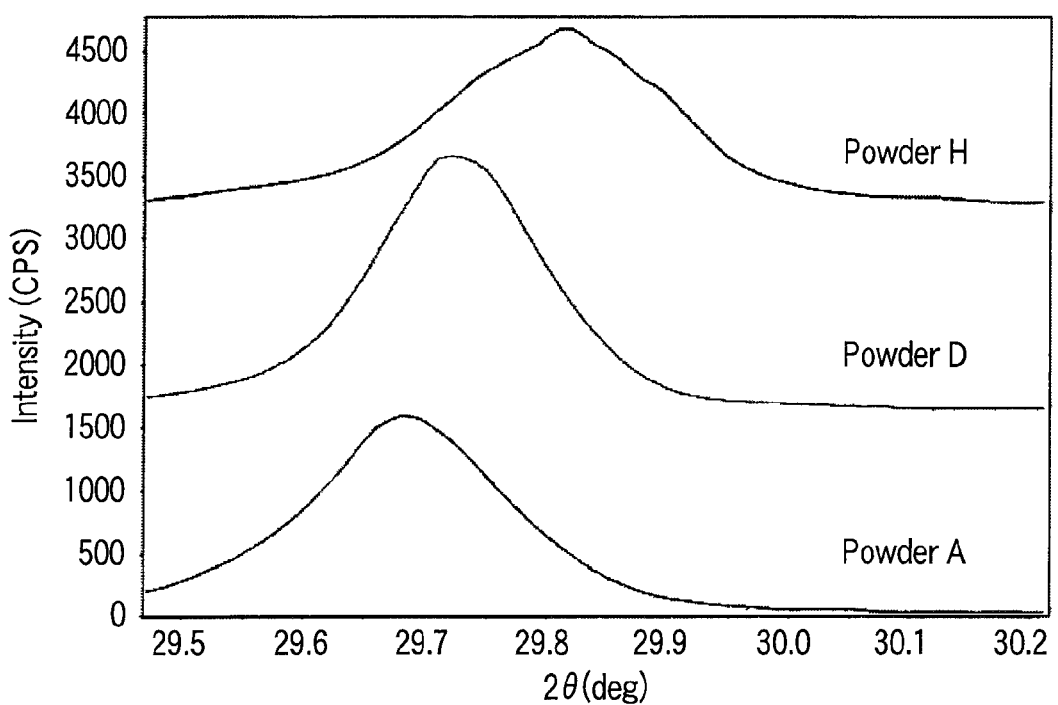
F I G. 4

MULTI-COMPONENT-SYSTEM LITHIUM PHOSPHATE COMPOUND PARTICLE HAVING AN OLIVINE STRUCTURE AND LITHIUM SECONDARY BATTERY EMPLOYING THE LITHIUM PHOSPHATE COMPOUND PARTICLE AS A POSITIVE ELECTRODE MATERIAL

CROSS REFERENCE TO RELATED APPLICATIONS

This is a Continuation Application of PCT Application No. PCT/JP2009/068074, filed Oct. 20, 2009, which was published under PCT Article 21(2) in Japanese.

This application is based upon and claims the benefit of priority from prior Japanese Patent Application No. 2008-270091, filed Oct. 20, 2008, the entire contents of which are incorporated herein by reference.

BACKGROUND OF THE INVENTION

1. Field of the Invention

This invention relates to multi-component system lithium phosphate compound particles having an olivine structure, the manufacturing method thereof and a lithium secondary battery employing the lithium phosphate compound particles as a positive/electrode material.

2. Description of the Related Art

A lithium secondary battery employing, as a negative electrode active material, metallic lithium, lithium alloys or a material which is capable of absorbing and desorbing lithium ion is characterized by a high voltage and by excellent reversibility. Especially, in the case of a lithium ion secondary battery wherein a composite oxide comprising lithium and a transitional metal is employed as a positive electrode active material and a carbonaceous material is employed as a negative electrode active material, since the battery is lighter in weight and larger in discharging capacity as compared with the conventional lead secondary battery or with the conventional nickel-cadmium secondary battery, it is widely employed as a power source for various electronic devices.

As for the positive electrode active material for a lithium ion secondary battery which is generally employed at present, a compound such as $LiCoO_2$, $LiNiO_2$, $LiMnO_2$ or $LiMn_2O_4$ is mainly employed. However, the reserve of cobalt and nickel is small and, moreover, the output of these metals is limited to a limited area. Because of these reasons, when it is desired to employ these materials as a positive electrode active material for a lithium ion secondary battery whose demand is expected to be further increased from now on, the employment of materials containing these metals are restricted not only in the respect of price but also in the respect of stabilized supply of raw materials. Further, in view of safety also, since these active materials are high in reactivity, the employment of these active materials may raise problems. Further, although manganese is a relatively cheap material, the employment of a material containing manganese as a positive electrode active material may give rise to problem of stability in cycle characteristics of battery.

For these reasons, there has been proposed in JP-A 9-134724, JP-A 9-134725 and JP-A 2001-085010 the employment, as a positive electrode active material of lithium secondary battery, of lithium iron phosphate or partially substituted lithium iron phosphate containing other element(s) substituting for a portion of iron. In these materials, iron which is large in output, cheap in price and promising in stable supply is employed as a raw material.

However, since these lithium phosphate compounds having an olivine structure are very high in electric resistance as compared with lithium metal oxide such as $LiCoO_2$, etc., which has been conventionally employed, the resistance polarization is caused to increase during the charging/discharging operation, thereby raising problems that it is impossible to obtain a sufficient discharge capacity and receivability for charging the battery. These problems become more prominent on the occasion of carrying out the charge/discharge of large electric current.

As one of the methods for solving these problems, there has been studied to finely pulverize the particle of lithium phosphate-based material having an olivine structure so as to increase the reactive surface area of the particle and to facilitate the diffusion of lithium ions, thereby shortening the distance through which electrons are enabled to flow in the interior of the particles of lithium iron phosphate-based material. However, the finely pulverized particle of lithium phosphate-based material having an olivine structure is characterized in that it tends to easily generate secondary aggregation on the occasion of mixing it with a conductive material such as carbon black, etc., during the process of manufacturing electrodes. If this secondary aggregation is caused to occur, since the particles of lithium iron phosphate-based material would be point-contacted with each other or with the electrically conductive material in the aggregated secondary particle, there is a problem in that it is impossible to obtain sufficient collecting effects, thereby greatly increasing electric resistance. For this reason, even if the charge/discharge of battery is performed, the active materials existing at a central portion of the aggregated particle are incapable of executing conduction of electrons, thus causing the deterioration of the charge/discharge capacity of the battery.

Furthermore, since the finely pulverized particle has a large surface area, the quantity of dissolution thereof into an electrolyte is liable to be increased, thus giving rise to a problem of long term stability. Further, due to the enlarged surface area, the quantity of a dispersing medium which is required for the preparation of a slurry on the occasion of preparing electrodes is caused to increase, thereby raising various problems such as the difficulty to secure a sufficient quantity of coating of lithium phosphate-based material, easy generation of cracking during the drying process thereof, and the difficulty of increasing the capacity of battery due to the difficulty in achieving a sufficient degree of compression.

In view of overcoming these problems, there has been proposed an idea of applying fine particle of a material which is electrically conductive and more noble in redox potential than lithium iron phosphate-based material such as silver, carbon, platinum, palladium, etc. (see for example JP-A 2001-110414).

There has been also proposed a method wherein carbon is used as an electrically conductive agent, and a solution, a fluid dispersion or a suspension containing a Li source, a Fe source, a P source and a C source is sprayed into an atmosphere of high temperatures to obtain a precursor, which is then heat-treated in a reducing atmosphere or in an inert atmosphere, thereby enabling carbon to uniformly disperse on the surface of the particles of lithium iron phosphate-based material (see for example JP-A 2005-116392).

There has been also known, as a method of further enhancing the electric conductivity among the particles, to employ lithium iron phosphate-based composite oxide/carbon composite wherein the surface of the particles of $LiFePO_4$ is covered with a carbonaceous material and an average particle diameter of the carbon composite is confined to 0.5 μm or less (see for example JP-A 2003-292309).

Meanwhile, the redox potential of iron existing in lithium iron phosphate is lower than other elements. For example, as compared with ordinary lithium cobaltate, the redox potential of iron is known as being lower by 0.2 V. Therefore, in an attempt to minimize electric resistance and to increase electric potential, a method has been proposed wherein one or more compounds containing a metal selected from the group consisting of iron, cobalt, manganese, nickel, copper and vanadium is allowed to react with one or more compounds containing lithium, the resultant reacted body being subsequently sintered at a prescribed temperature (see for example JP-A 2003-157845).

Further, there has been proposed a method wherein a portion of iron of lithium iron phosphate is replaced by cobalt (see for example Journal of Power Sources 146 [2005], pp. 580-583).

BRIEF SUMMARY OF THE INVENTION

Problems to be Solved by the Invention

However, in the case of the technique described in above-described JP-A 2001-110414, since metallic particles are carried on fine particles of lithium iron phosphate-based material, these metallic particles are vulnerable to chemical denaturalization, thereby giving rise to a problem of stability. Further, since these metallic particles are disposed so as to connect with each other, it is impossible to sufficiently solve the problem of low current collecting properties. Further, in the method of the technique described in above-described JP-A 2005-116392, carbon is used as a conductive agent and is uniformly dispersed on the surfaces of particles. Even with this method, it is impossible to sufficiently secure the effects of dispersion, thereby making it impossible to expect sufficient current-collecting effects.

On the other hand, in the case of the technique described in above-described JP-A 2003-292309 disclosing a method of further enhancing the conductivity between the particles, since it requires a high degree of particle control of the active material of battery, it is accompanied with a problem that such a high degree of control is very difficult.

According to the techniques disclosed in JP-A 2003-157845, and Journal of Power Sources, there is disclosed a method of manufacturing a multi-component system olivine type compound, wherein plural kinds of aqueous solutions of metallic salts or plural kinds of raw material powders are uniformly mixed together and then the resultant mixture is formed into a precursor and sintered. This method however is accompanied with problems that the control of the composition of the precursor for obtaining a pure olivine type compound is complicated, that the crystallinity of the olivine type compound is liable to be increased, thereby making it difficult to obtain a sufficient conductivity, and that it is difficult to control the particle size.

Since the surface of particles of an olivine type lithium M phosphate-based material (M=metal) is lower in crystallinity as compared with the bulk thereof, the olivine type lithium M phosphate-based material is assumed as being amorphous. Because of this, bivalent metals are easily oxidized as the olivine type lithium M phosphate-based material is left in air atmosphere and turned into trivalent phosphate which is more electrically resistant. As a result, since a large degree of polarization is caused to generate on the occasion of initial charging, this lithium phosphate-based material is accompanied with problems that it require severe storage conditions, that the activation of the material would become complicate, and that electric resistance components may be left behind. These problems would be more prominent as the particle diameter of the active material becomes smaller and the surface area thereof becomes larger.

Means for Solving the Problems

According to a first aspect of the present invention, there is provided multi-component system lithium phosphate compound particles having an olivine structure and represented by a general formula of $Li_YM1_{1-Z}M2_ZPO_4$ in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is an number satisfying a formula of $0 < Z \leq 0.1$, wherein a concentration of the metal element M2 existing on a surface of the particle is higher than the concentration of that existing in core portion of the particle and that the concentration of the metal element M2 is continuously lowered from the surface of particle to a core portion of the particle.

According to a second aspect of the present invention, there is provided composite particles of carbon and multi-component system lithium phosphate compound having an olivine structure and represented by a general formula of $Li_YM1_{1-Z}M2_ZPO_4$, in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is an number satisfying a formula of $0 < z \leq 0.1$, wherein a concentration of the metal element M2 existing on a surface of the particle is higher than the concentration thereof existing in core portion of the particle and that the concentration of the metal element M2 is continuously lowered from the surface of particle to the core portion of the particle, and the composite particles are prepared by mixing a lithium M1 phosphate compound having an olivine structure and represented by a general formula of $Li_XM1PO_4$ in which M1 is one metal element selected from the group consisting of Fe, Mn and Co, and X is a number satisfying a formula of $0.9 \leq X \leq 1.2$, a precursor of lithium M2 phosphate compound having an olivine structure and represented by a general formula of $Li_XM2PO_4$ in which M2 is at least one metal element selected from the group consisting of Mn, Co, Mg, Ti and Al, and X is a number satisfying a formula of $0.9 \leq X \leq 1.2$, and carbon or a carbon source to obtain a mixture; and subjecting the mixture to heat treatment in an inert atmosphere or in vacuum.

According to a third aspect of the present invention, there is provided a method of manufacturing a multi-component system lithium phosphate compound particle having an olivine structure and represented by a general formula of $Li_YM1_{1-Z}M2_ZPO_4$ in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is an number satisfying a formula of $0 < z \leq 0.1$, in which a concentration of the metal element M2 existing on a surface of the particle is higher than the concentration of that existing in a core portion of the particle and that the concentration of the metal element M2 is continuously lowered from the surface of particle to the core portion of the particle; the method comprising: mixing a lithium M1 phosphate compound having an olivine structure and represented by a general formula of $Li_XM1PO_4$ in which M1 is one metal element selected from the group consisting of Fe, Mn and Co, and X is an number satisfying a formula of $0.9 \leq X \leq 1.2$, and a precursor of a lithium M2 phosphate compound having an olivine structure and represented by a general formula of $Li_xM2PO_4$ in which M2 is at least one metal element selected from the group consisting of Mn, Co, Mg, Ti and Al, and X is an number satisfying a formula of $0.9 \leq X \leq 1.2$ to form a mixture; and subjecting the mixture to heat treatment in an inert atmosphere or in vacuum.

According to a fourth aspect of the present invention, there is provided a method of manufacturing a composite particle of carbon and a multi-component system lithium phosphate compound particle having an olivine structure and represented by a general formula of $Li_yM1_{1-z}M2_zPO_4$ in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is an number satisfying a formula of $0 < Z \leq 0.1$, in which a concentration of the metal element M2 existing on a surface of the particle is higher than the concentration of that existing in core portion of the particle and that the concentration of the metal element M2 is continuously lowered from the surface of particle to the core portion of the particle; the method comprising: mixing a lithium M1 phosphate compound having an olivine structure and represented by a general formula of $Li_xM1PO_4$ in which M1 is one metal element selected from the group consisting of Fe, Mn and Co and X is an number satisfying a formula of $0.9 \leq X \leq 1.2$, a precursor of a lithium M2 phosphate compound having an olivine structure and represented by a general formula of $Li_xM2PO_4$ in which M2 is at least one metal element selected from the group consisting of Mn, Co, Mg, Ti and Al and X is an number satisfying a formula of $0.9 \leq X \leq 1.2$, and carbon or a carbon source to form a mixture; and subjecting the mixture to heat treatment in an inert atmosphere or in vacuum.

According to a fifth aspect of the present invention, there is provided a lithium secondary battery comprising, a positive electrode, a negative electrode, and an electrolyte containing lithium salt, wherein the positive electrode includes the multi-component system lithium phosphate compound particles having an olivine structure as described in the first aspect and/or the composite particle of carbon and multi-component system lithium phosphate compound having an olivine structure as described in the second aspect.

Effects to be Obtained from the Invention

According to the present invention, it is possible to easily manufacture an active material for the positive electrode of lithium secondary battery, to enhance the electric conductivity inside the active particle and between the active particles and to make smooth the movement of lithium ions, thereby making it possible to obtain a positive electrode active material and a lithium secondary battery which are excellent in high rate charge/discharge properties.

BRIEF DESCRIPTION OF THE SEVERAL VIEWS OF THE DRAWING

FIG. 3 is an X-ray diffraction pattern of each of powder A, powder D and powder H; and FIG. 4 is a graph illustrating an enlarged view of the peak that was developed in the vicinity of $2\theta=30°$ in each of patterns of FIG. 3.

DETAILED DESCRIPTION OF THE INVENTION

Figure 1:
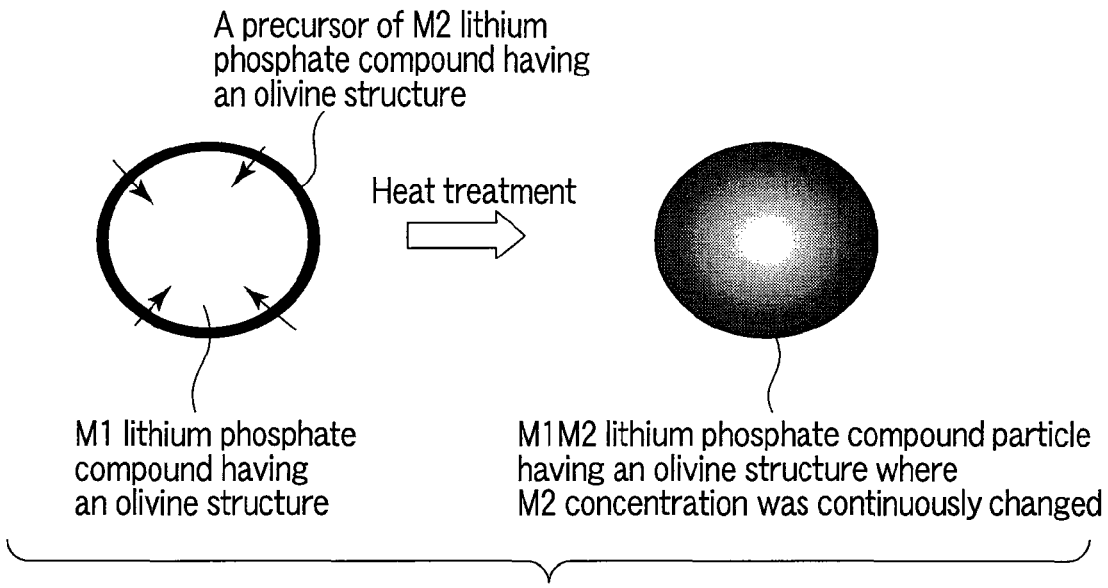
FIG. 1 is a diagram schematically illustrating a state wherein the concentration of the metal element M2 existing on the surface of the particle is continuously lowered from the surface of particle to the core portion of the particle in lithium M1M2 phosphate compound particles having an olivine structure.

A multi-component system lithium phosphate compound having an olivine structure can be manufactured by mixing a lithium M1 phosphate compound having an olivine structure, in which M1 is one metal element selected from the group consisting of Fe, Mn and Co, and a precursor of a lithium M2 phosphate compound having an olivine structure, in which M2 is at least one metal element selected from the group consisting of Mn, Co, Mg, Ti and Al, and then subjecting the mixture to heat treatment in an inert atmosphere or in vacuum.

The lithium M1 phosphate compound is represented by a general formula of $Li_xM1PO_4$, in which M1 is one metal element selected from the group consisting of Fe, Mn and Co, and X is a number satisfying a formula of $0.9 \leq X \leq 1.2$, and the lithium M2 phosphate compound is represented by a general formula of $Li_xM2PO_4$, in which M2 is at least one metal element selected from the group consisting of Mn, Co, Mg, Ti and Al, and excluding one which is already selected as M1, and X is a number satisfying a formula of $0.9 \leq X \leq 1.2$.

In the above-described formulas, when X is less than 0.9, since Li is greatly deviated from 1, it is difficult to form a stable single-phase and the active material may be brought into a state of partial charge, thereby making it unpreferable in designing the battery or in selecting 2 as the valence of M. Further, when X is larger than 1.2, it is difficult to form a stable single-phase and since the free Li is increased, the degree of alkalinity would be unpreferably increased on making the compound into an aqueous paste.

The multi-component system lithium phosphate compound to be obtained in this case can be represented by a general formula of $Li_yM1_{1-z}M2_zPO_4$ in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al, and excluding one which is already selected as M1; and Z is a number satisfying a formula of $0 < Z \leq 0.1$.

The reason for confining Y to the range of 0.9-1.2 in the above-described formula is the same as in the case of X.

Further, when Z is larger than 0.1, the capacity of battery may be unpreferably decreased.

Active material particles for the positive electrode can be obtained by grinding the above-described multi-component system lithium phosphate compound and then classifying the resultant particles. The particle diameter of the active material particles for the positive electrode may preferably be confined to not larger than 20 μm.

As for specific examples of metal M1, they include Fe, Mn and Co. As for specific examples of metal M2, they include Mn, Co, Mg, Ti and Al. For example, in a case where M1 is Fe, when the active material particle for the positive electrode is obtained by selecting, as M2, an element which more resistive to oxidation than Fe such as Mn, Co, Mg, Ti and Al, the oxidation of Fe can be suppressed due to a high surface concentration of these metals, thereby making it possible to realize the long-term storage of the active material and the electrode and at the same time the elution of Fe components can be suppressed, thereby making it possible to obtain a secondary battery which is stable for a long period of time.

As for the precursor of the lithium M2 phosphate compound, it is possible to employ a mixture of phosphate or a mixture of various metal salts and phosphoric acid, where the stoichiometric ratio thereof is made commensurate with each other. As for the metal salt, it is possible to employ manganese (II) sulfate, manganese (II) nitrate, manganese (II) carbonate, manganese (II) oxide, etc. The kneading of various raw materials may be performed by sufficient mixing thereof in an aqueous dispersion medium or in an organic dispersion medium. This mixing can be performed by means of a media dispersion method using a bead mill, etc.

The mixture thus obtained is dried and sintered by heating it in an inert gas atmosphere or in vacuum. The drying step may be performed for two hours at 100° C. for example. As for the inert gas, it is possible to employ, for example, argon gas or nitrogen gas. The sintering step may be performed for about three hours at 600° C. for example.

As a result of these processes, a reaction to enable the M2 to substitute for the M1 in the particle is allowed to take place gradually starting from the surface of lithium M1 phosphate compound particle having olivine structure that has been initially synthesized, thereby conceivably allowing a phenomenon to take place, wherein the concentration of M2 is continuously lowered from the surface of lithium M1 phosphate compound particle having an olivine structure to the core portion thereof. This state is schematically illustrated in FIG. 1.

Figure 2:
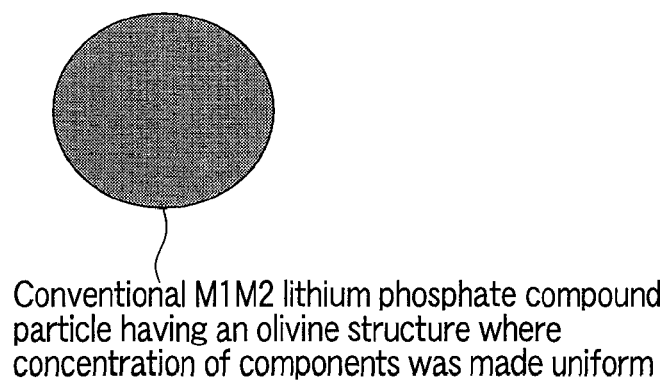
FIG. 2 is a diagram schematically illustrating a state wherein the concentration of each of the components is made uniform in a conventional lithium M1M2 phosphate compound particle having an olivine structure.

Whereas, a multi-component system lithium phosphate particle having an olivine structure wherein the concentration of each of the components is made uniform is schematically illustrated in the same manner in FIG. 2.

The multi-component system lithium phosphate compound particle having an olivine structure wherein the concentration of M2 is continuously changed as described above according to the present invention is featured in that, as compared with the conventional multi-component system lithium phosphate compound particle having an olivine structure which is prepared from a homogeneous solution, the crystallinity of the compound is varied, and the electric conductivity of bulk as well as the movement of lithium ion are made smooth, thereby probably enhancing the high-rate charge/discharge properties of the battery.

Further, when a precursor of the lithium M2 phosphate compound is mixed with carbon or a carbon source and the resultant mixture is further mixed with the lithium M1 phosphate compound having an olivine structure and sintered, the electric conductivity between particles is enhanced, thereby making it possible to obtain further enhanced high-rate charge/discharge properties of the battery. Additionally, it is also possible to improve the coating properties of the slurry of active material on preparing the electrode and to enhance the filling density of the active material. As for the carbon to be used herein, it is preferable to employ acetylene black, kitchen black, furnace black, etc. Further, as for specific examples of carbon source, they include organic compounds such as sucrose, polyvinyl alcohol, petroleum pitch, ethylene glycol, etc.

A positive electrode plate to be obtained by making use of the active material formed of the aforementioned lithium phosphate compound having an olivine structure can be prepared by coating an aqueous paste to be obtained through kneading and dispersion of the active material, a conductive agent, a water-soluble thickening agent, binder and water as a dispersing agent on the surface of a collector and then by drying the paste.

The lithium phosphate compound particle having an olivine structure which constitutes the active material for the positive electrode has preferably a primary particle diameter of not larger than 1 μm or less, more preferably not larger than 0.5 μm. As for the conductive agent to be contained in the paste, it is possible to employ conductive carbon such as acetylene black, kitchen black, furnace black, carbon fiber, graphite, etc.; conductive polymers and metal powder. Among them, the employment of conductive carbon is especially preferable. These conductive agents may preferably be used at a ratio of not more than 20 parts by weight per 100 parts by weight of the active material for the positive electrode. More preferable range of these conductive agents is 1-10 parts by weight per 100 parts by weight of the active material.

As for specific examples of the water-soluble thickening agent, they include carboxymethyl cellulose, methyl cellulose, hydroxyethyl cellulose, polyethylene oxide, etc. These water-soluble thickening agents may preferably be used at a ratio of 0.1-4.0 parts by weight, more preferably 0.5-3.0 parts by weight per 100 parts by weight of the active material for the positive electrode. If the quantity of the water-soluble thickening agent is larger than the aforementioned upper range, the cell resistance of the secondary battery may be increased, thereby deteriorating the charging/discharging rate characteristics. On the other hand, if the quantity of the water-soluble thickening agent is smaller than the aforementioned lower range, the aqueous paste may be caused to flocculate. The aforementioned water-soluble thickening agent may be used as an aqueous solution. In this case, the water-soluble thickening agent may preferably be used as a 0.5-3 wt % aqueous solution.

As for specific examples of the binder, they include, for example, fluorine binder, acrylic rubber, modified acrylic rubber, styrene butadiene rubber, acrylic polymer and vinyl polymer. These binders may be used individually or as a mixture consisting of two or more kinds thereof or as a copolymer. It is more preferable to employ acrylic polymer, since acrylic polymer is excellent in oxidation resistance and capable of securing a sufficient adhesion even with a small amount of use and of giving flexibility to the electrode plate. The mixing ratio of these binders may preferably be confined to 1-10 parts by weight, more preferably 2-7 parts by weight per 100 parts by weight of the active material for the positive electrode.

In the present invention, although water is employed as a dispersing medium, it may further contain, other than water, a water-soluble solvent such as an alcoholic solvent, an amine-based solvent, a carboxylic acid-based solvent, a ketone-based solvent, etc., for the purpose of improving the drying characteristics of the active material layer or the wettability of the active material layer to the collector.

In the present invention, for the purpose of improving the coating properties and leveling properties of the aqueous paste containing a lithium phosphate-based material having an olivine structure, a conductive agent, a water-soluble thickening agent, a binder and a dispersing agent, the aqueous paste may also contain a surfactant and a leveling agent such as a water-soluble oligomer. The dispersion of the aqueous paste can be carried out by any known dispersing machine such as a planetary mixer, a dispersion mixer, a bead mill, a sand mill, an ultrasonic dispersing machine, a homogenizer, a Henschel mixer, etc. If it is desired to suitably employ a lithium iron phosphate material having a particle diameter of not larger than 1 μm, it is more preferable to employ a media dispersion method which is capable of using a dispersion medium of small particle size such as the bead mill, the sand mill, etc. The paste thus prepared is coated and dried to form a coated film retaining suitable porosity.

The aqueous paste for coating containing positive electrode active material and prepared in this manner is then coated on the surface of collector which is made of a metal foil. As for the material for the collector, it is possible to employ metal foil made of copper, aluminum, nickel, stainless steel, etc. Among them, it is more preferable to employ aluminum for the preparation of the collector for positive electrode.

The coating of the aqueous paste onto the metal foil for the collector can be carried out by making use of any known coating method selected from gravure coating, gravure reverse coating, roll coating, Meyer bar coating, blade coating, knife coating, air knife coating, comma coating, slot die coating, slide die, dip coating, etc.

In the present invention, the aqueous paste is uniformly coated so as to confine the dry weight thereof to the range of 2-10 mg/cm$^2$, more preferably 3-8 mg/cm$^2$. With respect to the method of drying the paste, although there is not any particular limitation, it may be carried out, for example, by means of hot air drying, heated air drying, vacuum drying and drying using a far infrared ray heater. The temperature for the drying may be within the range of 30-130° C. For example, the coated layer of paste may be left standing in a hot air drying apparatus which is kept at a temperature of 100° C. and when the change in weight thereof for a period of one hour becomes not more than 0.1% by weight, the drying process is terminated. Subsequently, the dried layer is preferably subjected to pressing by making use of a plate press or a roll press.

With respect to the negative electrode, any material which is capable of doping with lithium or dedoping lithium as the active material may be used. For example, it is possible to employ, for example, pyrolytic carbons; cokes such as pitch coke, needle coke, petroleum coke, etc.; graphite; vitreous carbons; the sintered mass of organic polymer compounds (which is carbonized by baking phenol resin, furan resin, etc., at suitable temperatures); carbon fibers; activated carbon; metal lithium; alloys such as lithium alloys, Sn-based compounds; and polymers such as polyacetylene, etc.

These negative electrode active materials are subsequently mixed with a binder and, if required, a conductivity-improving agent to obtain a mixture which is then subjected to kneading and dispersion together with a dispersing medium, thereby obtaining a paste for the negative electrode. The paste is then coated on the surface of a collector and dried and rolled to manufacture a negative electrode plate. As for the collector for the negative electrode, it is possible to employ, for example, copper, nickel, stainless steel, etc. Among them, the employment of copper foil is more preferable. Although there is not any particular limitation with respect to the electrolyte, it is preferable to employ a nonaqueous electrolyte.

With respect to the nonaqueous electrolyte, it is possible to employ, without any limitation, any of those which have been conventionally employed in the ordinary lithium secondary battery. For example, it is possible to employ those which can be obtained by dissolving at least one material selected from the group consisting of inorganic lithium salts such as LiClO$_4$, LiBF$_4$, LiPF$_6$, LiAsF$_6$, LiCl, LiBr, etc.; and organic lithium salts such as LiBOB, LiB(C$_6$H$_5$)$_4$, LiN(SO$_2$CF$_3$)$_2$, LiC(SO$_2$CF$_3$)$_3$, LiOSO$_2$CF$_3$, etc., is dissolved in at least one solvent selected from the group consisting of cyclic esters such as carbonates such as propylene carbonate, ethylene carbonate, butylene carbonate, γ-butyrolactone, vinylene carbonate, 2-methyl-γ-butyrolactone, acetyl-γ-butyrolactone, γ-valerolactone, etc.; cyclic ethers such as tetrahydrofuran, alkyltetrahydrofuran, dialkyltetrahydrofuran, alkoxytetrahydrofuran, dialkoxytetrahydrofuran, 1,3-dioxorane, alkyl-1,3-dioxorane, 1,4-dioxorane, etc.; linear ethers such as 1,2-dimethoxy ethane, 1,2-diethoxy ethane, diethyl ether, ethyleneglycol dialkyl ether, diethyleneglycol dialkyl ether, triethyleneglycol dialkyl ether, tetraethyleneglycol dialkyl ether, etc.; and linear esters such as dimethyl carbonate, methylethyl carbonate, diethyl carbonate, alkyl propionate, dialkyl malonate, alkyl acetate, etc. It is especially preferable to employ nonaqueous electrolytes which can be obtained dissolving LiBF$_4$, LiPF$_6$, LiBOB or a mixture thereof in at least one of the aforementioned organic solvents.

With respect to the separator, although it is possible to employ any kind of porous film as long as it is insoluble to the components of the aforementioned electrolyte, it is preferable to a single layer or a multi-ply layer of fine-porous film made of polyolefin such as polypropylene, polyethylene, etc. Among them, the multi-ply layer is especially preferable. A nonaqueous electrolytic secondary battery can be manufactured by making use of the positive electrode plate of the present invention as described above and by combining it with known negative electrode, electrolyte, separator, etc., which are designed to be used in a nonaqueous electrolyte. As for the configuration of the battery, it may be a coin type, a button type, a laminate type, a cylindrical type, a square type or a flat type.

EXAMPLES

Example 1

Next, various examples of the present invention will be explained. Incidentally, it may not be construed that the present invention is limited to the following examples.

A lithium M1 phosphate compound having an olivine structure wherein M1 is Fe was synthesized by a hydrothermal method as described below.

First of all, 486 g of lithium phosphate and 795 g of bivalent iron chloride tetrahydrate as a bivalent iron compound were introduced, together with 2000 ml of distilled water, into a pressure vessel. Then, after being purged with argon gas, the vessel was sealed. This pressure vessel was placed in an oil bath maintained at 180° C., thereby allowing a reaction to take place for 48 hours. Subsequently, the pressure vessel was allowed to cool down to room temperature and the content therein was taken out and dried at a temperature of 100° C., thereby obtaining a powdery sample. This powdery sample was confirmed by means of X-ray diffraction patterns as being lithium iron phosphate. Further, it was confirmed, through the observation using a scanning electron microscope (SEM), that this powdery sample has a particle diameter of 20-200 nm.

A precursor of the lithium M2 phosphate compound having an olivine structure wherein M2 was Mn was synthesized as described below.

First of all, 72.3 g of manganese (II) sulfate pentahydrate was dissolved in 500 ml of ion-exchange water in a 2000-ml beaker to obtain a solution, to which 23.1 g of 85% phosphoric acid was added and sufficiently agitated. While continuing the agitation of the solution, a solution containing 24 g of sodium hydroxide dissolved in 100 ml of ion-exchange water was added drop-wise through a separatory funnel to the agitated solution for 30 minutes, thereby obtaining a precipitate. The dropping amount was adjusted so as to confine the pH of the reaction liquid to the range of 6.5<pH<7.0. The crystal thus obtained was taken up through filtration and sufficiently washed with ion-exchange water. The crystal thus washed was dried at 100° C. for 5 hours.

When the quantity of Mn in the product thus obtained was measured by means of ICP emission spectrography analysis, the product was found containing 79.1% of $Mn_3(PO_4)_2$. Further, it was confirmed, through the observation using a scanning electron microscope (SEM), that the product was formed of amorphous particle having a particle diameter of not more than 1 μm.

Then, 50 g of lithium hydroxide monohydrate was dissolved in 200 ml of ion-exchange water in a 2000-ml beaker to obtain a solution. While continuing the agitation of the solution, a solution containing 46 g of 85% phosphoric acid dissolved in 200 ml of ion-exchange water was added dropwise through a separatory funnel to the agitated solution for 30 minutes, thereby obtaining a precipitate. The crystal thus obtained was taken up through filtration and sufficiently washed with ion-exchange water. The crystal thus washed was dried at 100° C. for 5 hours.

When the quantity of Li in the product thus obtained was measured by means of ICP emission spectrography analysis, the product was found containing 99.3% of $Li_3PO_4$. Further, it was confirmed, through the observation using a scanning electron microscope (SEM), that the product was formed of needle crystal having a particle diameter of not more than 1 μm.

After executing the purity conversion of $Mn_3(PO_4)_2$ and $Li_3PO_4$, each of the powdery products was weighed so as to obtain a molar ratio of Mn:Li=1:1. Then, these products were sufficiently pulverized by making use of a dry type ball mill. The resultant powdery mixture was used as an $LiMnPO_4$ precursor.

$LiFePO_4$ and the $LiMnPO_4$ precursor thus obtained were mixed together so as to obtain a ratio of Li:Fe:Mn=1.0:0.9:0.1. Namely, 5.12 g of $LiFePO_4$ and 0.67 g of $LiMnPO_4$ precursor were mixed each other together with 10 ml of ion-exchange water and then resultant mixture was sufficiently mixed in a mortar to obtain a slurry. Then, this slurry was put into a graphite crucible and dried for two hours at 100° C. and then placed into a vacuum gas displacement furnace.

Then, after being sufficiently displaced with nitrogen gas, the interior of the furnace was turned into a state of vacuum and the dried material existing therein was subjected to a sintering treatment for three hours at 600° C. subsequently, the furnace was allowed to cool down to room temperature and the crucible was taken out of the furnace and the sample in the crucible was taken out. The sample was formed of a brittle bulky material. This bulky material was pulverized by means of a coffee mill and then classified, by means of a sieve, to obtain aggregated particles having a diameter of not more than 20 μm. The particle thus obtained was defined herein as powder A.

When this powder A was analyzed by means of an X-ray diffraction apparatus, it was found as being a single-phase olivine type compound. Further, it was also confirmed, as a result of ICP emission spectrography analysis, that the composition of each of the elements was the same as that of putting them into the crucible. It was confirmed, as a result of the measurement of size distribution by making use of SEM, that the particle diameter of the sintered particles was increased as compared with that before the sintering. Namely, the primary particle thereof was found as having a diameter ranging from about 0.7 to 3 μm.

Example 2

By employing the same $LiFePO_4$ and the $LiMnPO_4$ precursor as those obtained in Example 1, these compounds were mixed together so as to obtain a ratio of Li:Fe:Mn=1.0:0.9:0.1. Namely, 5.12 g of $LiFePO_4$ and 0.67 g of $LiMnPO_4$ precursor were mixed. Then, the resultant mixed powder was sufficiently mixed with a solution containing 0.512 g of sucrose dissolved in 10 ml of ion-exchange water in a mortar to obtain a slurry. Then, this slurry was introduced into a graphite crucible and dried for two hours at 100° C. and then placed into a vacuum gas displacement furnace.

Then, after being sufficiently displaced with nitrogen gas, the interior of the furnace was turned into a state of vacuum and the dried material existing therein was subjected to a sintering treatment for three hours at 600° C. Subsequently, the furnace was allowed to cool down to room temperature and the crucible was taken out of the furnace and the sample in the crucible was taken out. The sample was formed of a brittle black bulky material. This bulky material was pulverized by means of a coffee mill and then classified, by means of a sieve, to obtain aggregated particles having a diameter of not more than 20 μm. The particles thus obtained were defined herein as powder B.

When this powder B was analyzed by means of an X-ray diffraction apparatus, it was found as being a single-phase olivine type compound. Further, it was also confirmed, as a result of ICP emission spectrography analysis, that the ratio of the elements was the same as that on introducing into the crucible. Further, it was confirmed, as a result of the thermogravimetric analysis, that the quantity of carbon was 4% by weight. It was found, as a result of the measurement of size distribution by making use of SEM, that the particle diameter of the sintered particles was increased as compared with that before the sintering. Namely, the primary particle diameter ranges from about 0.7 to 3 μm.

Example 3

By employing the same $LiFePO_4$ and the $LiMnPO_4$ precursor as those obtained in Example 1, these compounds were mixed together so as to obtain a ratio of Li:Fe:Mn=1.0:0.9:0.1. Namely, 5.12 g of $LiFePO_4$ and 0.67 g of $LiMnPO_4$ precursor were mixed each other to obtain a mixture, to which 0.100 g of acetylene black was further added. Then, the resultant mixed powder was sufficiently mixed with a solution containing 0.512 g of sucrose dissolved in 10 ml of ion-exchange water in a mortar to obtain a slurry. Then, this slurry was introduced into a graphite crucible and dried for two hours at 100° C. and then placed into a vacuum gas displacement furnace.

Then, after being sufficiently displaced with nitrogen gas, the interior of the furnace was turned into a state of vacuum and the dried material existing therein was subjected to a sintering treatment for three hours at 600° C. Subsequently, the furnace was allowed to cool down to room temperature and the crucible was taken out of the furnace and the sample in the crucible was taken out. The sample was formed of a brittle black bulky material. This bulky material was pulverized by means of a coffee mill and then classified, by means of a sieve, to obtain aggregated particles having a diameter of not more than 20 μm. The particles thus obtained were defined herein as powder C.

When this powder C was analyzed by means of an X-ray diffraction apparatus, it was found as being a single-phase olivine type compound. Further, it was also confirmed, as a result of ICP emission spectrography analysis, that the ratio of the elements was the same as that on introducing into the crucible. Further, it was confirmed, as a result of the thermogravimetric analysis, that a total quantity of carbon was 6% by weight. It was found, as a result of the measurement of size distribution by making use of SEM, that the particle diameter of the sintered particles was increased as compared with that before the sintering. Namely, it was found that the primary particle diameter ranges from about 0.7 to 3 μm.

Comparative Example 1

A mixture of 65.99 g of $CH_3COOLi$, 156.56 g of $Fe(CH_3COO)_2$, 17.30 g of $Mn(CH_3COO)_2$, and 115.29 g of 85% $H_3PO_4$ was dissolved and agitated in 1000 ml of ion-exchange water to form a uniform solution. Then, this solution was dried at a temperature of 150° C. and the resultant dried material was placed in an electric furnace and subjected to sintering for 8 hours at 400° C. in an atmosphere of argon/hydrogen (92:8 v/v). Thereafter, the furnace was allowed to cool down to room temperature and a bulky precursor was obtained. This bulky precursor was pulverized again and placed again in an electric furnace. Then, the pulverized material was subjected to sintering for 24 hours at 600° C. in the same atmosphere as described above to obtain powder D.

When this powder D was analyzed by means of an X-ray diffraction apparatus, it was found as being a single-phase olivine type compound. Further, it was confirmed by means of ICP that elements had a ratio represented by $LiFe_{0.9}Mn_{0.1}PO_4$. It was found, as a result of the measurement of size distribution by means of SEM, that the particle diameter thereof ranged from about 20 to 100 nm.

Further, a solution containing 15 g of sucrose dissolved in the aforementioned ion-exchange water was added to the aforementioned mixture and subjected to the same treatments as described above to obtain powder defined herein as powder E. It was confirmed, as a result of the thermogravimetric analysis, that a total quantity of carbon was 6% by weight.

Comparative Example 2

486 g of lithium phosphate, 716 g of bivalent iron chloride tetrahydrate as a bivalent iron compound and 65 g of bivalent manganese chloride dihydrate as a bivalent manganese compound were introduced, together with 2000 ml of distilled water, into a pressure iron vessel (autoclave). Then, after being purged with argon gas, the vessel was sealed. This pressure vessel was placed in an oil bath of 180° C., thereby allowing a reaction to take place for 48 hours. Subsequently, the pressure vessel was allowed to cool down to room temperature and the content therein was taken out and dried at a temperature of 100° C., thereby obtaining a powdery sample.

The powdery sample thus obtained was confirmed by means of X-ray diffraction patterns as being a single-phase olivine type compound. Further, it was confirmed by means of ICP that elements had an atomic ratio represented by $LiFe_{0.9}Mn_{0.1}PO_4$. Further, It was found, as a result of the measurement of size distribution by means of SEM, that the particle diameter thereof ranged from about 20 to 100 nm. This powdery sample was defined herein as powder F.

Then, a solution containing 1 g of sucrose dissolved in ion-exchange water was added to 10 g of powder F and sufficiently kneaded in a mortar to obtain a slurry. Then, this slurry was introduced into a graphite crucible and dried for two hours at 100° C. and then placed into a vacuum gas displacement furnace. Then, after being sufficiently displaced with nitrogen gas, the interior of the furnace was turned into a state of vacuum and the dried material existing therein was subjected to a sintering treatment for three hours at 600° C. Subsequently, the furnace was allowed to cool down to room temperature and the crucible was taken out of the furnace and the sample in the crucible was taken out. The sample was formed of a brittle black bulky material. This bulky material was pulverized by means of a coffee mill and then classified, by means of a sieve, to obtain aggregated particles having a diameter of not more than 20 μm. The particles thus obtained were defined herein as powder G. When this powder G was analyzed by means of an X-ray diffraction apparatus, it was found as being a single-phase olivine type compound. Further, it was confirmed, as a result of the thermogravimetric analysis, that the quantity of carbon was 4% by weight. It was found, as a result of the measurement of size distribution by making use of SEM, that the particle diameter of the sintered particles was increased as compared with that before the sintering. Namely, it was found that the primary particle diameter ranged from about 0.7 to 3 μm.

Comparative Example 3

An $LiMnPO_4$ precursor was mixed with a suitable quantity of ion-exchange water and sufficiently kneaded in a mortar to obtain a slurry. Then, this slurry was introduced into a graphite crucible and dried for two hours at 100° C. and then placed into a vacuum gas displacement furnace. Then, after being sufficiently displaced with nitrogen gas, the interior of the furnace was turned into a state of vacuum and the dried material existing therein was subjected to a sintering treatment for three hours at 600° C. Subsequently, the furnace was allowed to cool down to room temperature and the crucible was taken out of the furnace and the sample in the crucible was taken out. The sample was formed of a brittle bulky material. This bulky material was pulverized by means of a coffee mill and then classified, by means of a sieve, to obtain aggregated particles having a diameter of not more than 20 μm.

When the aggregated particles were analyzed by means of an X-ray diffraction apparatus, it was found as being formed of $LiMnPO_4$. Further, it was confirmed, even in the result of the quantification of Li and Mn by means of ICP emission spectrography analysis, the aggregated particles were formed of approximately pure $LiMnPO_4$. It was found, as a result of the measurement of size distribution by making use of SEM, that the particle diameter of the sintered particles was increased as compared with that before the sintering. Namely, it was found that the primary particle diameter ranged from about 0.7 to 3 μm.

The $LiFePO_4$ which was synthesized by means of hydrothermal method and the aforementioned $LiMnPO_4$ powder were mixed each other at a molar ratio of 9:1 and then sufficiently dispersed in a mortar to obtain a uniform powdery product which was defined herein as powder H.

Comparative Example 4

The $LiFePO_4$ which was obtained by means of hydrothermal method was defined herein as powder I. A solution containing 1 g of sucrose dissolved in ion-exchange water was added to 10 g of powder I and sufficiently kneaded in a mortar to obtain a slurry. Then, this slurry was introduced into a graphite crucible and dried for two hours at 100° C. and then placed into a vacuum gas displacement furnace. Then, after being sufficiently displaced with nitrogen gas, the interior of the furnace was turned into a state of vacuum and the dried material existing therein was subjected to a sintering treatment for three hours at 600° C. Subsequently, the furnace was allowed to cool down to room temperature and the crucible was taken out of the furnace and the sample in the crucible was taken out.

The sample thus obtained was formed of a brittle black bulky material. This bulky material was pulverized by means of a coffee mill and then classified, by means of a sieve, to obtain aggregated particles having a diameter of not more than 20 μm. The particles thus obtained were defined herein as powder J. When this powder J was analyzed by means of an X-ray diffraction apparatus, it was found as being a single-phase olivine type compound. Further, it was confirmed, as a result of the thermogravimetric analysis, that the quantity of carbon was 4% by weight. It was found, as a result of the measurement of size distribution by making use of SEM, that the particle diameter of the sintered particles was increased as compared with that before the sintering. Namely, it was found that the primary particle diameter ranged from about 0.7 to 3 μm.

(Crystallographic Comparison of Particles Obtained)

X-ray diffraction patterns of powder A, powder D and powder H, all having the same ratio of Fe:Mn=9:1, are shown in FIG. 3. As seen from FIG. 3, all of these powders indicated a characteristic pattern of a lithium phosphate type compound having a basic olivine structure. In the case of powder H which was formed of a mixed powder consisting of LiFePO$_4$ and the LiMnPO$_4$, any clear separation of peak was not recognized.

As shown in FIG. 4, it was found out, through an enlargement of the peaks appearing in the vicinity of 2θ=30° indicating a (020) face, differences in the position of developing peaks depending on each of synthesizing methods. It was assumed from this finding that the crystal form was caused to change depending on synthesizing method, thereby indicating that powder A of the present invention was different from powder D obtained by means of the conventional uniform synthesis method even if the composition thereof was the same as that of powder A.

As a result of cyclic voltammetry executed on powders A to J, a broad redox peak originating from Mn was recognized in powders A to C, thereby indicating the existence of concentration gradient. Whereas in the cases of powders E to G, this redox peak originating from Mn was not recognized. Further, in the case of powder D, a sharp redox peak originating from Mn was recognized.

(Manufacture of Positive Electrode)

Acetylene black as a conductive agent was mixed with each of powders A to J that had been obtained in Examples and Comparative Examples in such a manner that a total quantity of carbon became 10% by weight. The mixed powders thus obtained was respectively mixed with polyvinylidene fluoride (PVdF) employed as a binder at a weight ratio of 95:5 to obtain a mixture, to which N-methyl-2-pyrrolidone (NMP) was added and sufficiently kneaded, thereby obtaining a slurry for the positive electrode.

Aluminum foil collectors each having a thickness of 15 μm were coated with each of the positive electrode slurries thus obtained at a coating amount of 100 g/m$^2$ and then dried for 30 minutes at a temperature of 120° C. Thereafter, the dried coating layer was subjected to rolling work by making use of a roll press so as to create a density of 1.8 g/cc. The rolled coating layer was then punched out to obtain a disc-like product having a size of 2 cm$^2$ for use as a positive electrode. The positive electrodes manufactured by making use of powders A to J are herein referred to as positive electrodes A to J, respectively. Each of the specifications are summarized in the following Table 1.

TABLE 1

| Positive electrode | Powder | Ratio between element contents (weight ratio) Fe | Mn | Acetylene black + Carbon precipitate (wt %) | Chemical formula/ Existence of carbon |
|---|---|---|---|---|---|
| A | A | 0.9 | 0.1 | 0 | LiFe$_{0.9}$Mn$_{0.1}$PO$_4$ |
| B | B | 0.9 | 0.1 | 4 | LiFe$_{0.9}$Mn$_{0.1}$PO$_4$/C |
| C | C | 0.9 | 0.1 | 6 | LiFe$_{0.9}$Mn$_{0.1}$PO$_4$/C + AB |
| D | D | 0.9 | 0.1 | 0 | Solid phase LiFe$_{0.9}$Mn$_{0.1}$PO$_4$ |
| E | E | 0.9 | 0.1 | 4 | Solid phase LiFe$_{0.9}$Mn$_{0.1}$PO$_4$/C |
| F | F | 0.9 | 0.1 | 0 | Hydrothermal LiFe$_{0.9}$Mn$_{0.1}$PO$_4$ |
| G | G | 0.9 | 0.1 | 4 | Hydrothermal LiFe$_{0.9}$Mn$_{0.1}$PO$_4$/C |
| H | H | 0.9 | 0.1 | 0 | 0.9LiFePO$_4$ + 0.1LiMnPO$_4$ Mixture |
| I | I | 1.0 | 0.0 | 0 | LiFePO$_4$ |
| J | J | 1.0 | 0.0 | 4 | LiFePO$_4$/C |

Incidentally, in the above Table 1, C+AB in the chemical formula of powder C (positive electrode C) means the co-existence of carbon C originating from sucrose and acetylene black (AB).

(Confirmation of Electrochemical Characteristics of Positive Electrode)

In order to confirm the electrochemical characteristics of battery, three-electrode type cell (single pole cell) was manufactured. Positive electrodes A to J manufactured as described above were used as a positive electrode and a lithium metal electrode was used as a negative electrode and also as a reference electrode. A mixture of ethylene carbonate and diethyl carbonate, which were mixed at a volume ratio of 1:1, was used as an electrolyte.

For the purpose of evaluating the electrode, a charge/discharge of 0.2 CA was executed in the first to fifth cycles, wherein the charge-terminating potential was set to 4.5 V and the discharge-terminating potential was set to 2.0 V. The fifth cycle was employed in a 0.2 CA capacity confirmation test. Then, under the same conditions as in the aforementioned case where terminating potential of charge/discharge was set to 0.2 CA, the discharge of battery was performed at 1, 5 and 10 CA and the charging of battery was executed with the same electric current as that of discharging, thereby confirming the capacity thereof. Incidentally, the potential was a value reference to Li metal. The results obtained are shown in the following Table 2.

TABLE 2

| Positive electrode | Powder | Discharging capacity (mAh/g) | | | | Charging capacity (mAh/g) | | | |
|---|---|---|---|---|---|---|---|---|---|
| | | 0.2CA | 1CA | 5CA | 10CA | 0.2CA | 1CA | 5CA | 10CA |
| A | A | 156 | 145 | 126 | 102 | 155 | 144 | 124 | 100 |
| B | B | 158 | 149 | 132 | 111 | 158 | 149 | 130 | 110 |
| C | C | 161 | 152 | 138 | 125 | 161 | 152 | 137 | 124 |
| D | D | 155 | 139 | 108 | 59 | 154 | 137 | 104 | 56 |
| E | E | 159 | 142 | 112 | 70 | 159 | 140 | 108 | 66 |
| F | F | 156 | 140 | 110 | 63 | 155 | 139 | 105 | 57 |
| G | G | 158 | 144 | 115 | 75 | 158 | 143 | 110 | 71 |
| H | H | 155 | 140 | 102 | 55 | 153 | 135 | 97 | 45 |
| I | I | 160 | 141 | 103 | 61 | 160 | 142 | 107 | 65 |
| J | J | 165 | 154 | 125 | 80 | 165 | 148 | 114 | 72 |

It was found out from the results shown in above Table 2 that positive electrodes A to C according to the present invention was excellent especially in a high-rate charge/discharge properties of 5 CA or more. The reason for this may be attributed to the fact that since the concentration of Mn of the binary active material consisting of Fe and Mn was caused to continuously change inside the particle, it was possible to enhance the electric conductivity of the interior of particle and to realize smoother transferring of Li ions.

In the case of positive electrode B as well as positive electrode C where the powder thereof was treated together with a carbon source, since the electric conductivity between particles was also improved, it was possible to obtain more excellent characteristics.

In the cases of positive electrodes D to G wherein a binary active material formed of a uniform composition of Fe and Mn, although it was possible to obtain the effects of carbon, the resistance including reaction resistance was large when an electric current of 5 CA or more was used, thus exhibiting prominent deterioration of capacity. In the case of positive electrode H which was formed of a mixture of $LiFePO_4$ and $LiMnPO_4$, due to the influence of $LiMnPO_4$ exhibiting a large resistance of particle, the properties thereof was assumably caused to entirely deteriorate. With respect to positive electrode I and positive electrode J both formed of single system, although it was possible to easily secure capacity at a lower rate, they were accompanied with the problem that the decrease of charge/discharge capacity was prominent at a higher rate.

What is claimed is:

1. A multi component system lithium phosphate compound particle having an olivine structure and represented by a formula of $Li_YM1_{1-z}M2_zPO_4$, in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is a number satisfying a formula of $0 \leq Z \leq 0.1$, wherein a concentration of the metal element M2 contained in a surface of the particle is higher than the concentration of the metal element M2 contained in a core portion of the particle, and the concentration of the metal element M2 is continuously lowered from the surface of particle to a core portion of the particle.

2. A composite particle of carbon and a multi-component system lithium phosphate compound having an olivine structure and represented by a formula of $Li_YM1_{1-z}M2_zPO_4$, in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is a number satisfying a formula of $0 \leq Z \leq 0.1$, wherein a concentration of the metal element M2 contained in a surface of the particle is higher than the concentration of the metal element M2 contained in a core portion of the particle, and the concentration of the metal element M2 is continuously lowered from the surface of particle to the core portion of the particle, and the composite particle is prepared by mixing a lithium M1 phosphate compound having an olivine structure and represented by a formula of $Li_xM1PO_4$, in which M1 is one metal element selected from the group consisting of Fe, Mn and Co, and X is a number satisfying a formula of $0.9 \leq X \leq 1.2$, a precursor of a lithium M2 phosphate compound having an olivine structure and represented by a formula of $Li_xM2PO_4$, in which M2 is at least one metal element selected from the group consisting of Mn, Co, Mg, Ti and Al, and X is a number satisfying a formula of $0.9 \leq X \leq 1.2$, and carbon or a carbon source to obtain a mixture; and subjecting the mixture to a heat treatment in an inert atmosphere or in vacuum.

3. A lithium secondary batter comprising a positive electrode, a negative electrode, and an electrolyte containing lithium salt, wherein the positive electrode includes the multi-component system lithium phosphate compound particle having an olivine structure as claimed in claim 1.

4. A lithium secondary battery comprising a positive electrode, a negative electrode, and an electrolyte containing lithium salt, wherein the positive electrode includes the composite particle of carbon and a multi-component system lithium phosphate compound having an olivine structure as claimed in claim 2.

5. The lithium secondary battery according to claim 4, wherein the positive electrode further comprises a multi-component system lithium phosphate compound having an olivine structure and represented by a formula of $Li_YM1_{1-z}M2_zPO_4$, in which M1 is one metal element selected from the group consisting of Fe, Mn and Co; Y is a number satisfying a formula of $0.9 \leq Y \leq 1.2$; M2 is at least one metal element selected from the group consisting of Mn, Co, Mg, Ti and Al; and Z is a number satisfying a formula of $0 \leq Z \leq 0.1$, wherein a concentration of the metal element M2 contained in a surface of the particle is higher than the concentration of the metal element M2 contained in a core portion of the particle, and the concentration of the metal element M2 is continuously lowered from the surface of particle to a core portion of the particle.

* * * * *